Dec. 27, 1927.　　　　　　　　　　　　　　1,654,177
H. M. KORETZKY
SELF CENTERING CORE FOR DRY BATTERIES
Filed Dec. 31, 1924

Harry M. Koretzky
Inventor

By his Attorney

Patented Dec. 27, 1927.

1,654,177

UNITED STATES PATENT OFFICE.

HARRY M. KORETZKY, OF HOBOKEN, NEW JERSEY.

SELF-CENTERING CORE FOR DRY BATTERIES.

Application filed December 31, 1924. Serial No. 759,067.

In constructing dry battery cells of the type wherein an external zinc cup constitutes one electrode of each cell, it is customary to cover the carbon electrode with a depolarizing mixture which is generally secured in place by wrapping with thin textile material. The "core" thus constructed is then put into the zinc cup, a space being left all around the core to accommodate the electrolyte. Insulation is placed upon the bottom of each zinc cup before introducing the carbon terminal and core.

After the introduction of the cores in this manner, and while the electrolyte is being introduced, it is necessary to provide external means for holding the cores and carbons as nearly in an exactly central position as possible, in order to prevent uneven distribution of current and consequent short life for each cell. The use of such external centralizing means involves a considerable expense of time and labor, the saving of which is of great importance in this art.

The present invention has for its object the saving of this time and labor in the manufacture of dry cells of the general type above mentioned.

Figure 1:
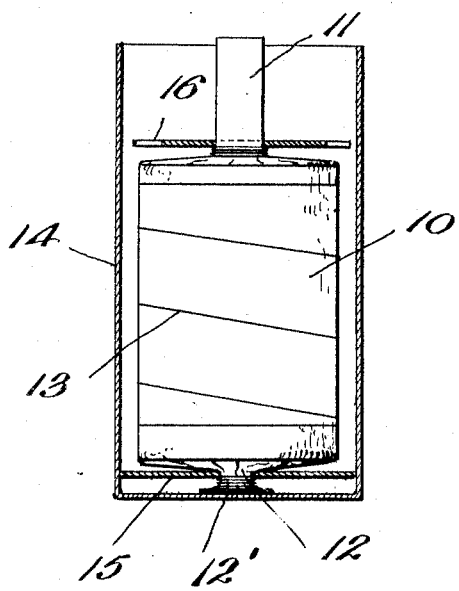
Figure 2:
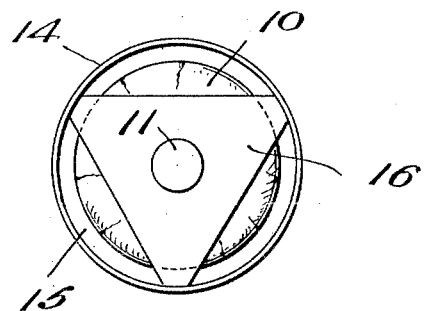

The invention is illustrated in a preferred form in the accompanying drawings, wherein Figure 1 is a view partly in elevation and partly in vertical section of a partly completed dry cell of the above mentioned type made in accordance with my invention, and Figure 2 is a top view of the same.

In the preferred form shown the core 10 surrounding the carbon electrode 11 is held in place by fabric the under end of which is twisted to form a central knob 12, the whole being held together by thread or elastic 13.

The zinc electrode is the cup 14, and before introducing the core into the same, an insulating disc or washer 15 is applied to the lower end of the core; said disc having a central aperture, as shown to accommodate the knob 12. This knob 12 is treated with paraffin or equivalent material, and an insulating washer 12$^a$ is preferably placed between the knob and the bottom of the zinc cup.

At the upper end of the core is placed a flat centering piece 16 of insulating material, such, for instance, as fiber. This piece has a central aperture which fits snugly over the circular carbon electrode 11, as shown; and it is so proportioned that its periphery makes snug contact at a number of points around the electrode 11 with the interior of the zinc cup 14 when the electrode 11 is in a properly centered position. This centering piece, in addition to the condition just described, should be more or less discontinuous, in order that, when the electrolyte is poured into the top of the cup, it may find its way readily to the space provided for it around the core. These two conditions are characteristic of the centering piece. As shown in Figure 2 especially, however, I prefer to make this star-shaped, and the three pointed star shown is entirely effective, although, of course, a star with more points may be used.

The electrode and attached core having been provided with the disc 15 and the centering piece, is introduced into the usual zinc cup in the manner shown in the drawings, and the cell is then ready to receive the electrolyte. Where this construction is adopted, the adequate centering of each core is insured and is preserved during manufacture without its being necessary to employ any auxiliary or external centering means, thereby shortening the operation and rendering it more certain.

What I claim is—

1. In a dry battery cell a core wrapped with textile material having its lower part disposed to form a projection, and an insulating centering disc having an opening through which said projection extends.

2. Apparatus as in claim 1 wherein the lower end of the projection is furnished with an insulating disc lying against the bottom of the cell.

In testimony whereof I affix my signature.

HARRY M. KORETZKY.